Nov. 28, 1967 P. S. FUSS 3,355,554

HIGH SPEED SPLIT CHANNEL TIME COMPRESSOR

Filed July 22, 1964 2 Sheets-Sheet 1

INVENTOR
P. S. FUSS
BY
Charles Scott Phelan
ATTORNEY

HIGH SPEED SPLIT CHANNEL TIME COMPRESSOR

Filed July 22, 1964 2 Sheets-Sheet 2

United States Patent Office 3,355,554

Patented Nov. 28, 1967

3,355,554

HIGH SPEED SPLIT CHANNEL TIME COMPRESSOR

Peter S. Fuss, Randolph Township, Morris County, N.J., assignor to Bell Telephone Laboratories, Incorporated, New York, N.Y., a corporation of New York Filed July 22, 1964, Ser. No. 384,552
6 Claims. (Cl. 179—15.55)

This invention relates to an electric signal time compressor and, more particularly, it relates to a delay line time compressor with increased bit rate flexibility.

Delay line time compressors, hereinafter called deltics, are known in the art; and one such compressor is discussed in the copending United States patent application of P. S. Fuss entitled, "Self-biased Threshold Circuit," Ser. No. 383,995 filed July 20, 1964, now United States Patent 3,267,296, issued Aug. 16, 1966. A deltic may be characterized as an electric signal time compressing circuit in which input signal samples are repeatedly circulated at a high bit rate through a closed loop circuit including a delay medium. New input signal samples are added to the loop recurrently at a much lower bit rate. The output of the deltic loop is a time compressed pulse train version of the input signal sample pulse train. The time compression ratio of the deltic circuit is sufficiently high to permit real time operations to be performed on the time compressed version of the input signals. For example, deltic circuits are employed in real time signal spectrum analyzers and in signal correlators.

The degree of resolution in the real time operations performed on time compressed signals from prior art deltic circuits is dependent upon the storage time, or the total number of bits stored divided by the input signal sampling rate. The degree of resolution required and the maximum required input frequency determine the minimum possible bit rate of circulation in the deltic loop as represented by the formula:

$$\text{(Minimum loop bit rate)} = \text{(Storage time)}\ (4)\ \text{(Highest input frequency)}^2$$

Note that in order to accommodate an increase in the input frequency to a level that is double the previous highest input frequency, the prior art circuits require a new loop bit rate of four times the previous bit rate in the loop. The maximum bit rate is determined by the state of the art in delay means and in high frequency circuit techniques. In general, the higher the bit rate the tighter the system tolerances will be on parameters such as delay line characteristics. Thus, for reliable production equipment it is desirable to operate with a bit rate as low as will provide the required performance. Some specific benefits of the low bit rate are that temperature tracking of delay lines is easier, deltic circuits and their utilization circuits are simpler, delay lines operating at lower bit rates are less costly, and the lower bit rate means a longer delay time can be tolerated so that a less costly delay line can be utilized in the deltic.

In the past when designers of deltic circuits have been pushed to the upper bit rate limit of the state of the art for delay lines, various attempts have been made to increase the maximum input frequency that can be handled by employing band splitting techniques. These techniques involve band splitting an input signal, band shifting the split components, performing the time compression function on each split and shifted component in separate time compressors, and then recombining the time compressor outputs. This approach is a rather difficult one because it is hard to secure the desired band splitting and shifting and output recombining operations without distortion at the crossover points.

It is therefore one object of the present invention to improve electric signal time compressors.

It is another object to increase the bit rate flexibility of such time compressors.

A further object is to extend the effective bit rate of deltic systems beyond the maximum capabilities of known deltic circuits.

These and other objects of the invention are realized in one illustrative embodiment in which a pluralty $n$ of delay line time compressor circuits are operated in step with one another. Input signal samples are applied to the inputs of the different compressors so that successive input signal samples are coupled into the different deltic circuits in recurring sequence. Thus, the effective input signal sampling rate is $n$ times the rate of application of signal sample pulses to any one deltic circuit. Within each deltic circuit signal samples are time compressed, and the outputs of all of the deltics are combined to form a time compressed version of the input signal.

In a modified form of the invention, amplitude quantizing circuits are employed in combination with time compression circuits.

It is one feature of the invention that the deltic circuits are clock-signal controlled and a single control is provided for all of the deltic circuits.

It is another feature that appropriate delays are inserted in the input and output coupling circuits for the individual deltics so that all of the individual deltics may be operated in step in response to the same series of clock control pulses.

Another feature is that time compressed signals are obtained with a resolution which is substantially better than that available from a single deltic circuit without the necessity for band splitting and band shifting input signals.

Still another feature of the invention is that all of the deltic circuits which receive samples of a given input signal wave include in such samples all signal frequency components available for sampling at the input to the time compression circuit at sampling time.

Still another feature is that successive time samples of input signals are coupled to different time compression channels of the over-all time compressor circuit.

Yet another feature is that the use of parallel operated deltic circuits in the fashion described permits the operation of a time compression circuit with loop bit rates $n^{1/2}$ times the bit rates required to process the same information to the same resolution with conventional time compressors. In other words, the maximum input frequency that can be handled by a multichannel deltic system is $n$ times the corresponding frequency for a single channel.

A further feature is that by employing plural deltic channels in a time division fashion, the circuits utilizing their outputs can operate at lower bit rates than would be possible with prior art circuits operating under the same circumstances.

An additional feature is that the use of amplitude quantizing circuits, such as delta modulation circuits, in combination with multichannel deltic operation significantly improves the fidelity of time compression.

A more complete understanding of the invention and its various features, objects, and advantages may be obtained from a consideration of the following detailed description and the appended claims when considered in connection with the attached drawing in which:

Figure 1:
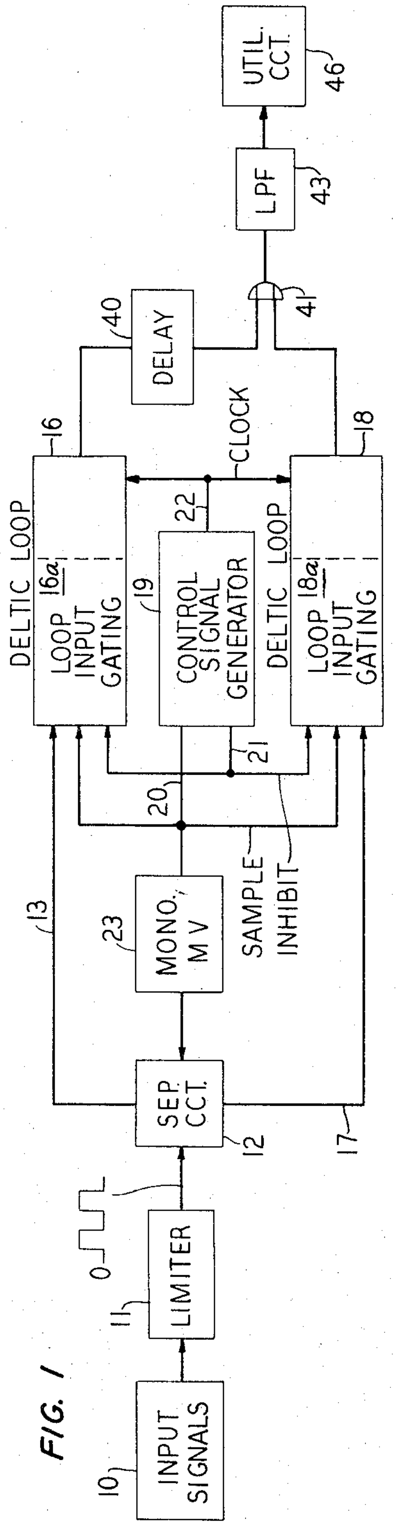
FIG. 1 is a block and line dagram of an electric signal time compressor system in accordance with the invention.

In FIG. 1, the time compressor circuit of the invention is shown in an embodiment which, for convenience of description, includes only two time compression channels. However, it is to be understood that the invention is not so limited. Likewise, the illustrated embodiment is a deltic circuit for digital signals, but the principles of the invention are also applicable to analog applications.

Input signals to the time compressor circuit are supplied by an input signal source 10 and are coupled to a limiter circuit 11 in which both frequency band limiting and amplitude limiting are accomplished in a well known manner to facilitate the time compression operation. A separating circuit 12 receives the output of limiter 11 in the form illustrated in FIG. 3A and divides that signal into plural parts, which are equal in number to the time compression channels employed, in a manner which will be discussed in connection with FIG. 2.

One output of the separating circuit 12 is applied by a circuit 13 to an input connection of a deltic loop circuit 16, and a second output of the separating circuit 12 is coupled by a circuit 17 to input connections of another deltic loop circuit 18. A control signal generator 19 supplies sampling pulses on a circuit 20, and inhibit pulses on a circuit 21. The sampling and inhibit signals are employed in the deltic loop input gating circuits to couple input signal samples thereto at predetermined times in the manner taught in the aforementioned Fuss application. Control signal generator 19 also supplies clock signals on a circuit 22 for controlling other operations of the deltic loops 16 and 18.

One illustrative form for the generator 19 is disclosed in the aforementioned Fuss application. The sample and inhibit pulses occur at the same pulse repetition rate $r$ and the clock pulses occur at a much higher rate $f$. A monostable multivibrator 23 couples sample pulses from the circuit 20 to the separating circuit 12 with a predetermined delay which corresponds for the illustrated embodiment to approximately one-half of the period of the sample signal wave on circuit 20. The samples in circuit 20 are illustrated in FIG. 3B and the delayed samples in the output of multivibrator 23 are illustrated in FIG. 3C. The sampling signal period T for one loop is also indicated in FIG. 3B.

Figure 2:
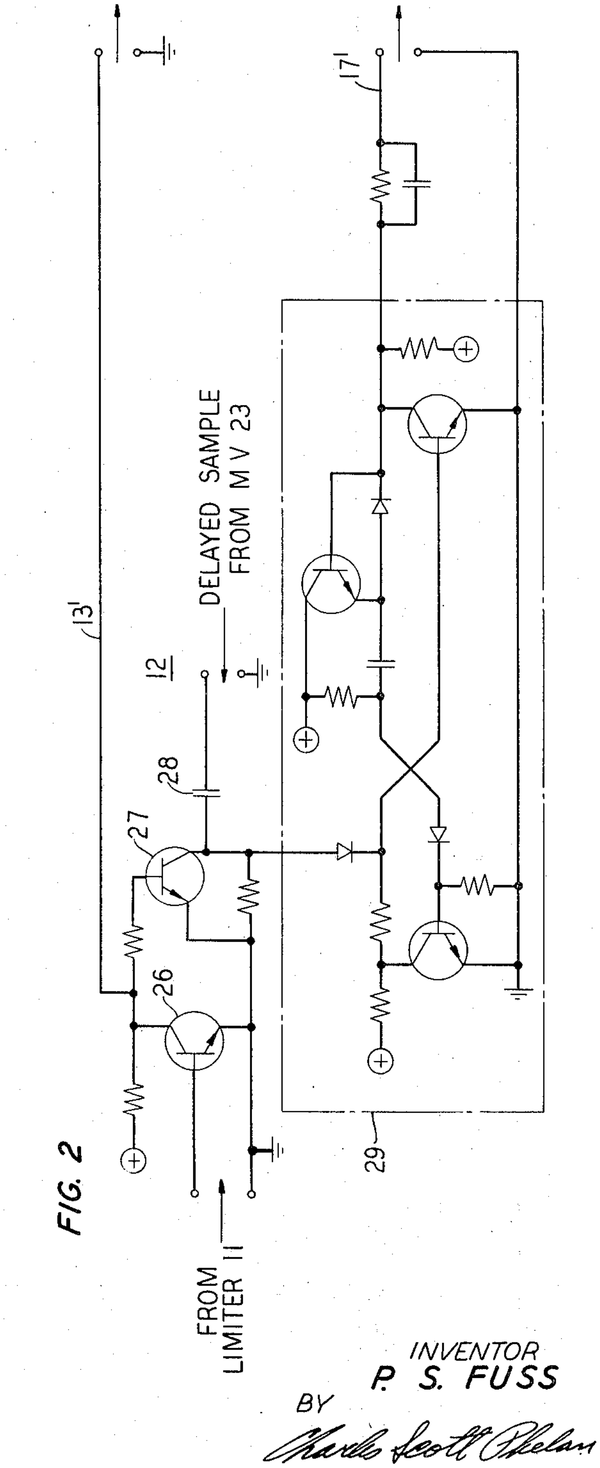
FIG. 2 is a schematic diagram of a part of the time compressor system of FIG. 1.

In FIG. 2 the details of separating circuit 12 are illustrated. The input signals from limiter 11 are applied to the base electrode of a transistor 26 which is connected as a common emitter buffer amplification stage. Signals appearing at the collector electrode of transistor 26 are applied directly to a lead 13′ corresponding to the circuit 13 of FIG. 1 for application to the deltic loop 16 in FIG. 1. A transistor 27 has its base electrode connected to the collector electrode of transistor 26 which acts as a switch operating either in cut off or saturation under the joint control of signals from transistor 26 and delayed sample pulses. Each delayed sample pulse from multivibrator 23 is coupled by a capacitor 28 to trigger the multivibrator 29 if transistor 27 is not in saturation.

Monostable multivibrator 29 has a quick recovery cross-coupling circuit and operates in a conventional manner to store the signal samples for a predetermined time represented by the duration of the multivibrator's unstable operating condition. In the illustrated embodiment, with two deltic loops in the time compressor system, the duration of the unstable period of the multivibrator 29 is approximately equal to three-quarters of the period T of the sampling signal pulse wave in circuit 20 and FIG. 3B. Thus, multivibrator 29 stores the information represented by the signal sample for at least one-half of a sampling pulse period plus some additional time for a safety factor.

Output pulses from the multivibrator 29 are coupled by a circuit 17′, corresponding to the circuit 17 of FIG. 1, the input of the deltic loop 18. For practical operating purposes the multivibrator 29 holds the input signal sample for the predetermined one-half of a sampling period before such sample is entered into the deltic circuit in a manner which will be outlined. The multivibrator is, however, arranged to reset at some later time after the entry of the information into the deltic circuit but before the occurrence of the next sampling pulse of the wave of FIG. 3B.

Returning now to FIG. 1, and keeping in mind the operation of the separating circuit 12 as described in connection with FIG. 2, it will be noted that the input signals to the time compressor are applied by the circuit 13 to the loop input gating circuits **16*a* of deltic loop 16 while samples of the input signal are applied by the circuit 17 to the loop input gating circuits 18*a* of deltic loop 18. The loop input gating arrangements for the deltic circuits are adapted to respond to sampling and inhibit pulses on the circuits 20 and 21 for periodically substituting a sample of the input signals on circuits 13 and 17 respectively, for a previously circulated sample in the respective loop circuits as taught in the aforementioned Fuss application. Each sampling pulse occurs simultaneously with an inhibit pulse in order to accomplish a substitution. The same sampling and inhibit pulses are simultaneously applied to corresponding input connections of all deltic channels of the over-all time compressor circuit. Thus, each sampling pulse which is applied to the deltic loop circuits causes a current-time sample of the input signal to be applied to the deltic loop 16 and simultaneously causes a stored sample which occurred previously in point of time to be applied to the input of deltic loop 18**.

Since the sampling and clock pulses are generated in synchronization as described in the aforementioned Fuss application, the deltic loop circuits are forced to operate in step on those simultaneously received samples. In order to keep the sampling and clock pulses in step with deltic delay line conditions, the generation of the output signals from generator 19 is advantageously accomplished by looping a synchronizing control signal for the generator 19 through a delay medium of the same type as is employed in the associated deltic loops. The sampling and clock pulses are thereby forced to track any changes in the characteristics of the delay materials employed in the deltic loop circuits. All associated delay paths are advantageously included in one body of material thereby further simplifying the job of making the paths track one another.

The output signals from the deltic loop circuits 16 and 18 are pulse trains which are substantially in step with one another, as a result of the aforementioned simultaneous clocking operation. In order to restore the original sequence and relative spacing of signal samples a delay circuit 40 is connected to the output of the deltic loop circuit 16. The output of delay circuit 40 and the output of deltic loop 18 are applied to the input connections of a logical OR circuit 41, and those input signals to OR circuit 41 are illustrated in FIGS. 4A and 4B, respectively.

The relationship among the input and output delays for the channels of the time compressor illustrated in FIG. 1 must be such as to restore the samples to their original sequence and relative spacing in time-compressed form. This may be generally stated in a form that is applicable to systems with more than two channels. Assume first that N is the time compression ratio of each deltic loop in FIG. 1. N is equal to M, the time compression ratio of the over-all circuit of FIG. 1; and both are equal to $T/T'$, where T′ is the time-compressed form of input sampling period T. The ratio N is the quotient of the bit rate in the output of an individual deltic loop divided by the sample pulse repetition rate in the input to the same loop. Assume also that $n$ is the number of deltic channels.

The input to each channel includes a delay equal to a different input fraction $a/b$ of the input sampling pulse wave period T. Such delays may, for example, be zero for one of the $n$ channels and a specific fraction of the sampling period for each of the other $(n-1)$ channels. Typically the different input fractions will all have $n$ as a common denominator, but that is not essential. In order to restore the time compression channel output samples to their proper order, the output of each channel includes means to delay the samples by a different output fraction $c/d$ of the time compressed sampling period T. For each channel, the output fraction $c/d$ is the supplement of the input fraction $a/b$ for the same channel, with respect to the largest input fraction for any channel. In other words, the difference between the largest input fraction $a/b$ for any of the channels and the input fraction $a/b$ for a particular channel is equal to the output fraction $c/d$ for that particular channel. The input and output fractions must each be no greater than unity.

In terms of FIGS. 1 and 2, there is zero delay to the input of deltic 16 so its input fraction is zero. There is a delay of one-half of the period of the wave in lead 20 to the input of deltic 18 so its input fraction is one-half. Consequently, one-half is the largest input fraction for all of the deltic channels illustrated. Delay circuit 40 supplements the zero input delay to deltic 16 by injecting a delay of one-half of a time compressed sampling period, and similarly the delay in the output of deltic 18 is zero.

OR circuit 41 interleaves the outputs of delay circuit 40 and deltic 18 to form the pulse wave illustrated in FIG. 4C. The output of OR circuit 41 is coupled to a low-pass filter 43 which is adapted to extract the envelope of the interleaved deltic output waves. This envelope is illustrated in FIG. 4D. The envelope is then coupled to a utilization circuit 46 of any appropriate type such as, for example, a spectrum analyzer.

Figure 3:
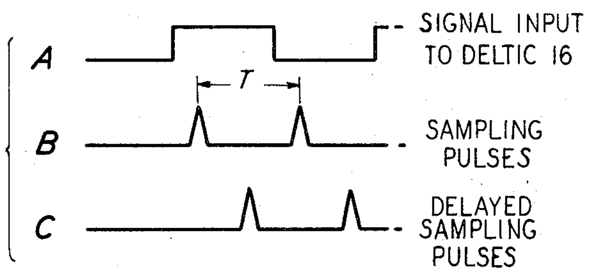
FIGS. 3 and 4 are electric signal diagrams illustrating the operation of the circuit of FIG. 1.
Figure 4:
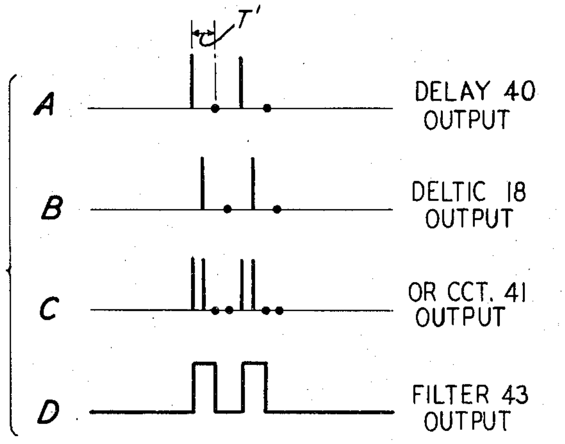

The general relationship of the time scales employed in FIGS. 3 and 4 is roughly indicated by the interval T in FIG. 3B, which corresponds to the interval T′ in FIG. 4A. This time relationship is shown only very crudely to indicate the nature of the time compressor operation. In one practical circuit that was actually operated, the time compression from the signal of FIG. 3A to the signal of FIG. 4D was a ratio representing more than three orders of magnitude.

Figure 5:
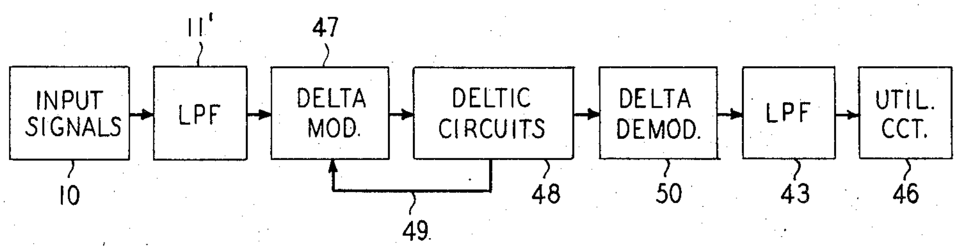
FIG. 5 is a block and line diagram of a modified form of the invention.

FIG. 5 illustrates a modified time compression system in accordance with the present invention and reference characters corresponding to those used in FIG. 1 are used for corresponding systems parts. The amplitude limiting function that was in limiter 11 of FIG. 1 has been eliminated; and in its place a delta modulator 47 is employed for amplitude quantizing the binary coded input signals from a low-pass filter 11′, which represents the remaining functions of limiter 11. The delta modulator can be any of the types known in the art. One such modulator is shown in the F. K. Bowers Patent 2,817,016, issued Dec. 17, 1957, and assigned to the same assignee as the present invention.

Deltic circuits 48 include all of the time compression circuits needed for a particular application, and in FIG. 1 that includes everything from the separating circuit 12 to OR circuit 41, inclusive. A lead 49 couples control pulses from the control circuit 19 in deltic circuits 48 to the modulator 47 for supplying timing pulses for the modulator operation. The delta modulator time constants, e.g., in the integration circuits of the modulator, are proportioned for modulator operation at the rate of the timing pulses. Such control, or timing pulses, would be the sampling pulses on lead 20 for a single-channel deltic; or in a multichannel deltic, the control pulses would be the output of an OR circuit receiving at its inputs the sampling pulse train and all of the delayed sampling pulse trains, respectively.

The output of circuits 48 is applied to a delta demodulator 50 of the type, for example, shown in the aforementioned Bowers patent. Demodulator 50 decodes the amplitude quantized pulses. However, the circuit time constants of such demodulator must be divided down by the time compression ratio M of the deltic in order to cooperate with the modulator 47 with respect to the time-compressed, amplitude-quantized pulses. Demodulator ouput is applied to filter 43 for utilization as before described in connection with FIG. 1.

Although the advantages of delta modulation are well known for ordinary transmission systems, such modulation bestows special benefits when used with a time compressor. For example, the elimination of the amplitude limiting circuit, which generally takes the form of some type of clipping, reduces the noise and its in-band harmonics normally produced by clipping in such limiting circuits. The modulator also can transmit without loss input information which may be superimposed upon a temporary level-shifting voltage and which information would normally be eliminated by an amplitude limiting stage.

Although the present invention has been described in connection with a particular embodiment thereof, it is to be understood that additional modifications and embodiments which will be apparent to those skilled in the art are included within the spirit and scope of the invention.

What is claimed is;

1. In combination:
plural deltic circuits for producing at the output thereof of a time compressed version of signals applied to the input thereof,
a source of input signals,
means coupling said signals to said deltic circuits with different amounts of delay,
means in said deltic circuits simultaneously gating signals from said coupling means into all of said deltic circuits, and
means combining the outputs of said deltic circuits.

2. In combination:
a plurality of delay line time compressor circuits,
a source of input signals,
means generating sampling control signals at a first predetermined rate and also generating clock signals at a second higher rate,
sampling means responsive to said sampling signals and connected to apply different samples of said input signals to different ones of said time compressor circuits,
means applying said clock signals to control the operation of said plural time compressor circuits simultaneously, and
means interleaving the outputs of said time compressor circuits.

3. In combination:
plural circuits for time compresisng signal pulse waves,
a source of input signals,
means applying said signals to the input of one of said time compressing circuits,
means sampling said input signals and applying successive ones of said samples to the inputs of different ones of said time compressing circuits,
means simultaneously gating into all of said time compressing circuits the signals at their various inputs, and
means combining the outputs of said time compressing circuits to form a time compressed version of said input signals.

4. In combination:
a plurality of deltic circuits,
means generating sampling pulses with a predetermined cyclic period,
means responsive to said sampling pulses gating input signals to one of said deltic circuits,
at least one delay means each having an individual output and delaying said sampling pulses by a different predetermined fraction of the period thereof, different storage means for each of the other of said deltic circuits, a source of input signals, means responsive to different delayed sampling pulses in the outputs of said delay means gating samples of said input signals to different ones of said storage means, each of said storage means being adapted to store a signal sample therein until the next occurring one of said sampling pulses, means in each of said other deltic circuits responsive to said sampling pulses and coupling the output of a different one of said storage means into such deltic, and means combining the outputs of said deltic circuits.

5. In combination:

a plurality $n$ of signal time compression channels, each of said channels having a predetermined time compression ratio N, a source of input signals, means generating sampling pulses in a sample pulse wave having a predetermined period T, means responsive to said sampling pulses gating said input signals to one of said channels, $(n-1)$ sample delay means receiving said sample pulses and each delaying a sample pulse received thereby by a different input fraction $a/b$ of said period T, $(n-1)$ separate pulse storage means in the input of each of the other of said channels, separate gating means each responsive to the output of a different one of said sample delay means and coupling a sample of said input signal to one of said pulse storage means, means responsive to said sample pulses simultaneously reading the output of each of said delay storage means into its corresponding time compression channel at the time that an input signal sample is gated into said one channel, means in the ouput of each of said channels delaying output signals therefrom by a time which is an output fraction $c/d$ of said period T, after time compression, where $(a/b+c/d)$ for any one channel is equal to the input fraction $a/b$ for the one of said $n$ channels having the largets input fraction $a/b$, means combining the ouputs of said channel output delay means.

6. In combination:

a plurality $n$ of signal time compression channels, each of said channels having a predetermined time compression ratio N, a source of input signals, means for generating sampling pulses in a sample pulse wave having a predetermined period T, means responsive to said sampling pulses gating said input signals to one of said channels, $(n-1)$ sample delay means receiving said sample pulses and each delaying sample pulses received thereby by a different fraction $a/n$ of said period T, wherein $a$ is a different integer for each one of said $n$ channels, $(n-1)$ separate pulse storage means in the input of each of the other of said channels, separate gating means each responsive to the output of a different one of said sample delay means and coupling a sample of said input signal to one of said pulse storage means, means responsive to said sample pulses simultaneously reading the output of each of said delay storage means into its correspondling time compression channel at the same time that an input signal sample is gated into said one channel, means in the output of each of said channels delaying output signals therefrom by a time $bT/nN$ where $b$ is a supplement of the integer $a$ for the same channel with respect to the largest $a$ of said channels, and means combining the outputs of said channel output delay means.

References Cited

UNITED STATES PATENTS

| | | | |
|---|---|---|---|
| 2,927,962 | 3/1960 | Cutler | 325—38.1 X |
| 3,202,764 | 8/1965 | Adams et al. | 179—15 |

JOHN W. CALDWELL, *Primary Examiner.*

J. T. STRATMAN, *Assistant Examiner.*